United States Patent [19]

Yamada

[11] Patent Number: 5,045,662
[45] Date of Patent: Sep. 3, 1991

[54] AUTOMATIC WIRE FEEDING METHOD AND APPARATUS FOR ELECTRODISCHARGE MACHINING

[75] Inventor: Hisashi Yamada, Nagoya, Japan

[73] Assignee: Mitsubishi Denki Kabushiki Kaisha, Tokyo, Japan

[21] Appl. No.: 480,984

[22] Filed: Feb. 16, 1990

[30] Foreign Application Priority Data

Feb. 23, 1989 [JP] Japan .................... 1-43836

[51] Int. Cl.⁵ .............................. B23H 7/10
[52] U.S. Cl. .................. 219/69.12; 219/69.17; 219/69.2
[58] Field of Search ............... 219/69.2, 69.12, 69.17, 219/69.19, 69.13

[56] References Cited

U.S. PATENT DOCUMENTS 4,547,647 10/1985 Schneider ............... 219/69.12

FOREIGN PATENT DOCUMENTS

205230 11/1984 Japan ................ 219/69.12
207527 8/1988 Japan ................ 219/69.2
11728 1/1989 Japan ................ 219/69.2
16323 1/1989 Japan .

Primary Examiner—Geoffrey S. Evans
Attorney, Agent, or Firm—Sughrue, Mion, Zinn, Macpeak and Seas

[57] ABSTRACT

An automatic wire feeding apparatus for an electrodischarge machine has a pipe guide for guiding a wire electrode from a feed roller to wire guides, for insertion through a starting hole in a workpiece. Compressed air fed into the pipe guide forces the wire electrode to vibrate during insertion. A contact detecting circuit detects contact between the wire electrode and the pipe guide. If the contact state continues for a certain time, indicating that insertion is impeded, a control circuit initiates corrective action by stopping the feed roller, cutting the wire electrode, then resuming feeding or by temporarily reversing the feed roller, then resuming forward feeding. Initiation of the corrective action is timed to occur before the wire electrode might ride off the feed roller.

16 Claims, 7 Drawing Sheets

AUTOMATIC WIRE FEEDING METHOD AND APPARATUS FOR ELECTRODISCHARGE MACHINING

BACKGROUND OF THE INVENTION

Wire electrodischarge machining (EDM) is widely used to manufacture molds and other metal objects because of its capability to cut arbitrary, precise shapes in a highly automated manner under numerical control. The cutting is effected by electrical discharge between a wire electrode and workpiece. The process normally begins with insertion of the wire electrode through a starting hole in the workpiece. Means of inserting the wire automatically are essential, so that multiple cuts can be made in the same workpiece without human intervention.

Electrodischarge machines are therefore equipped with automatic wire feeding apparatus capable of inserting and feeding the wire automatically. Such apparatus generally comprises a pair of wire guides disposed above and below the workpiece for holding the wire electrode steady as the workpiece is moved for cutting, a motor-driven feed roller for feeding the wire electrode to one of the wire guides, a wire collection roller, also motor-driven, for receiving the wire electrode from the other wire guide and maintaining the necessary wire tension, and pipe guides for guiding the wire electrode between the rollers and the wire guides. Prior to insertion, the wire electrode is cut at a point between the feed roller and the first wire guide. After the workpiece is mounted with its starting hole positioned between the wire guides, the wire electrode is fed forward through a pipe guide to the first wire guide, then through the starting hole and out through the second wire guide to the wire collection roller. This completes the insertion operation, after which cutting can begin.

Until the tip of the wire electrode engages the wire collection roller, the wire electrode moves in an incompletely constrained manner, guided largely by its own stiffness. If the wire electrode is not perfectly straight, or if one of the wire guides is off-center, or if the workpiece is misaligned, the tip of the wire electrode may catch on the wire guide or workpiece, impeding further insertion. Insertion may also be impeded by friction between the wire electrode and wire guides. As the feed roller continues to turn, the impeded wire electrode is forced to bend or loop along its path until eventually it rides off the feed roller, at which point the automatic wire feeding apparatus stops functioning and human intervention is required to recover normal operation. This problem is especially common with wire electrodes having a low stiffness coefficient.

SUMMARY OF THE INVENTION

An object of the present invention is accordingly to detect impedance of wire insertion, and stop feeding automatically before the wire electrode rides off the feed roller.

Another object of the invention is to take corrective action automatically.

An automatic wire feeding apparatus according to the invention comprises first and second wire guides for guiding a wire electrode into and out of a starting hole in a workpiece, feeding means for feeding the wire electrode toward the first wire guide, guiding means for guiding the wire electrode between the feeding means and the first wire guide, and vibrating means for vibrating the wire electrode inside the guiding means. A contact detecting circuit detects electrical contact between the wire electrode and the guiding means and produces a contact detect signal having one state representing contact and another state representing non-contact. A control circuit receives this contact detect signal and, if the contact state continues for a certain length of time, sends a feed control signal to the feeding means to initiate corrective action.

The corrective action may be to stop feeding, cut the wire electrode, then begin insertion anew. Alternatively, the corrective action may be to reverse the feeding means, thereby retracting the wire electrode, then resume feeding in the forward direction, in which case the number of times the corrective action is taken is preferably limited by a counter.

DETAILED DESCRIPTION OF THE EMBODIMENTS

A novel automatic wire feeding method and apparatus for inserting a wire electrode through a starting hole in a workpiece will be described with reference to FIGS. 1 to 6. These drawings illustrate part of a wire electrodischarge machine employing the novel method and apparatus. In the drawings the wire electrode is fed downward from above the workpiece, but the invention applies equally to electrodischarge machines in which the wire is fed upward from below the workpiece.

Figure 1:
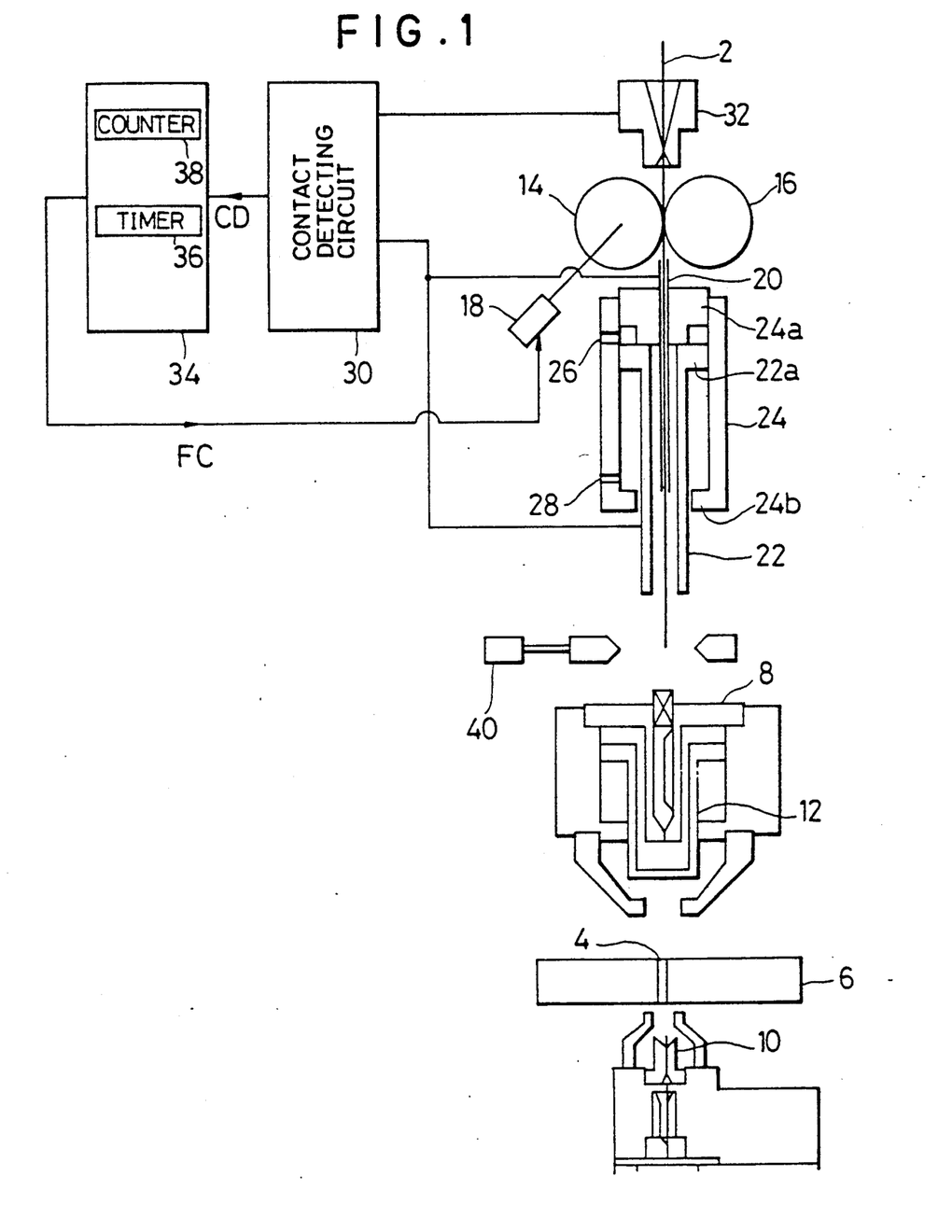
FIG. 1 is a sectional view of a novel automatic wire feeding apparatus, illustrating the state prior to insertion.

With reference to FIG. 1, the wire electrode 2 is to be inserted through a vertically oriented starting hole 4 in the workpiece 6. The automatic wire feeding apparatus comprises a first wire guide 8 disposed above and facing the workpiece 6, for guiding the wire electrode 2 into the starting hole 4, and a second wire guide 10 disposed below and facing the workpiece 10, for guiding the wire electrode 2 out of the starting hole 4. Passage of the wire electrode through the starting hole 4 is assisted by a water jet emitted from a nozzle 12.

The wire electrode 2 is fed toward the first wire guide 8 by a feeding means comprising a feed roller 14, a pinch roller 16 for pressing the wire electrode 2 against the feed roller 14, and a motor 18 for rotatively driving the feed roller 14. Between the feeding means and the first wire guide 8, the wire electrode 2 is guided by a guiding means comprising a first pipe guide 20 and a second pipe guide 22 with a piston member 22a at its upper end. The first pipe guide 20 and second pipe guide 22 are mounted in a cylinder 24 with an upper lid 24a and a lower end plate 24b, the first pipe guide 20 penetrating the upper lid 24a of the cylinder 24 to guide the wire electrode 2 from the feed roller 14 into the cylinder 24, while the second pipe guide 22 penetrates the lower end plate 24b of the cylinder 24, and the piston member 22a of the second pipe guide 22 is movable up and down inside the cylinder 24. The second pipe guide 22 surrounds the second pipe guide 22, with a gap between the first pipe guide 20 and second pipe guide 22.

The second pipe guide 22 is driven up and down in the cylinder 24 by compressed air fed into the cylinder 24 through a first air feeding port 26 disposed above the piston member 22a of the second pipe guide 22, and a second air feeding port 28 disposed below the piston member 22a of the second pipe guide 22.

Figure 6:
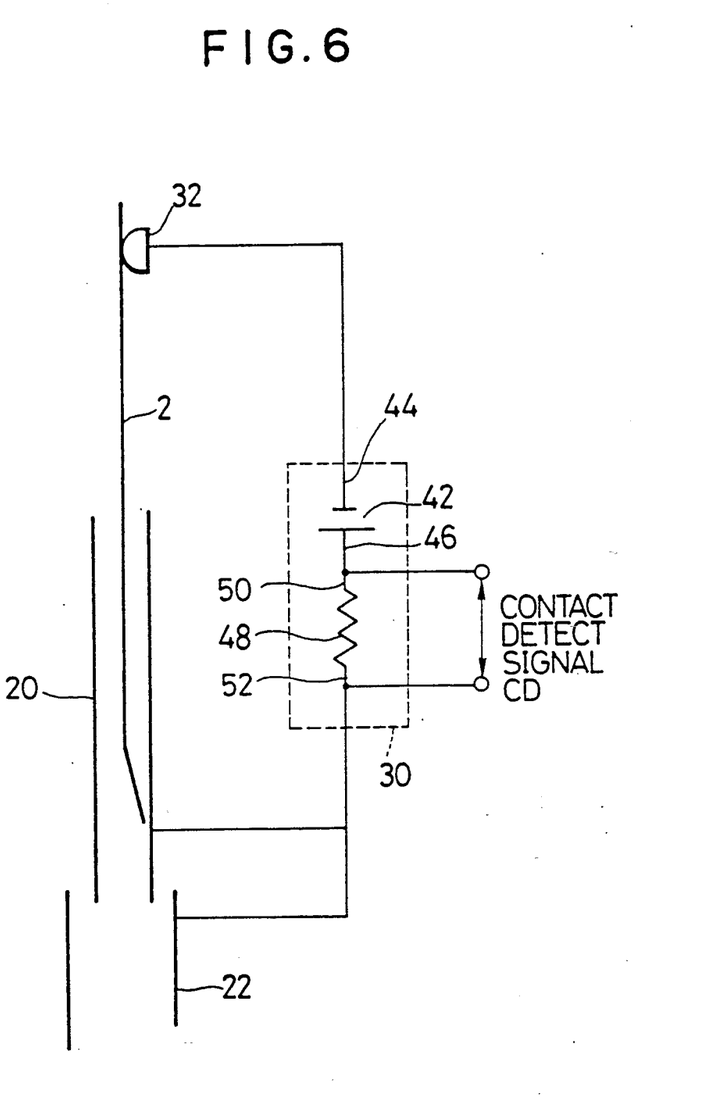
FIG. 6 is a schematic diagram of the contact detecting circuit.

The automatic wire feeding apparatus also comprises a contact detecting circuit 30 for detecting electrical contact between the wire electrode and the guiding means. Details of this circuit is shown in FIG. 6 and will be later. The contact detecting circuit 30 is electrically coupled to the wire electrode 2, the first pipe guide 20, and the second pipe guide 22 as shown in the drawing, the electrical coupling to the wire electrode 2 being effected by means of a contact cone 32 disposed above the feed roller 14. The contact detecting circuit 30 produces a contact detect signal CD having one state representing contact between the wire electrode and the guiding means and another state representing non-contact.

This contact detect signal CD is received by a control circuit 34 that is electrically coupled to both the contact detecting circuit 30 and the feeding means, more specifically to the motor 18. If the contact detect signal CD continues in the state representing contact for a certain time T, the control circuit 34 sends a feed control signal FC to the feeding means to initiate corrective action by, for example, temporarily stopping the motor 18, or temporarily reversing the motor 18 to retract the wire electrode 2.

The control circuit 34 may be a special-purpose circuit. Alternatively, the control circuit 34 may be part of a programmed microcomputer or similar device controlling the general operation of the electrodischarge machine and in particular the feeding of air through the first and second air feeding ports 26 and 28. In either case, the control circuit 34 contains a timer 36 for measuring the time during which the wire electrode 2 is in contact with the guiding means. The timer 36 may comprise, for example, a down-counter that is preset to a value equivalent to the time T whenever the contact detect signal CD from the contact detecting circuit 30 is in the state representing noncontact. Upon counting down past zero, the down-counter produces an underflow signal from which the feed control signal FC is generated.

A counter 38 should preferably be provided in the control circuit 34 to limit the number of times corrective action can be repeated. The purpose of the counter 38 is to prevent infinite repetition when insertion is not possible due to, for example, severe misalignment of the workpiece 6.

The automatic wire feeding apparatus also comprises a cutter 40 capable of cutting the wire electrode 2 at a point between the second pipe guide 22 and the first wire guide 8 when the second pipe guide 22 is in the raised position.

Figure 7:
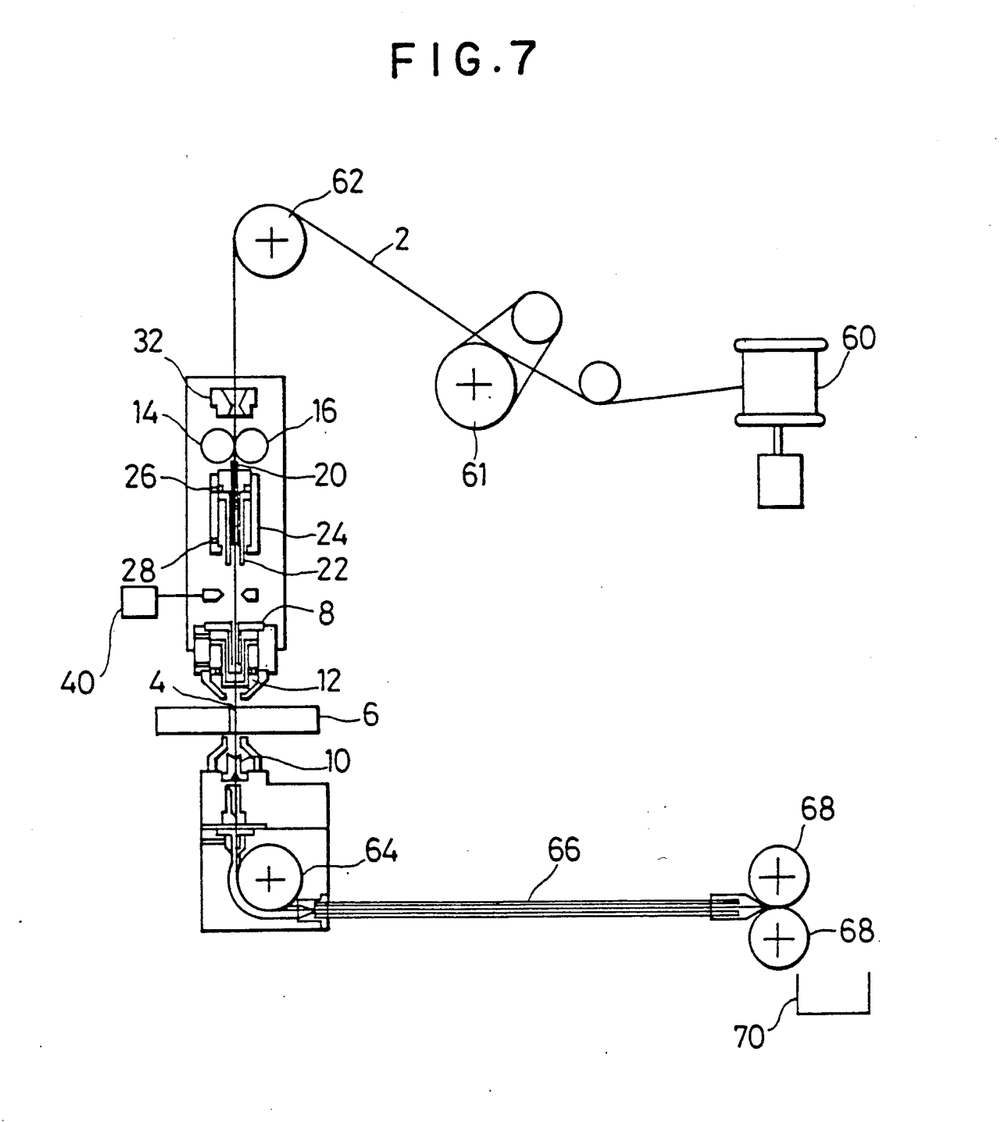
FIG. 7 is a schematic diagram showing a wire electrodicharge machine incorporating the automatic wire feeding apparatus of the invention.

The above-described automatic wire feeding apparatus is part of a wire electrodischarge machine shown in FIG. 7. As illustrated, the wire electrode 2 is unwound from a wire bobbin 60, passed via a braking device 61 for applying a tension on the wire electrode 2, and a guide pulley 62, and then to the contact cone 32 of the automatic wire feeding apparatus described above. The wire electrode 2 having passed the second wire guide 10 of the automatic wire feeding apparatus is then passed via a lower roller 64, a wire collection guide 66, and a wire collection roller 66, and then into a wire collection box 70. It will be appreciated that during the automatic insertion of the wire electrode 2, the wire electrode 2 is not fully constrained until the tip of the wire electrode 2 reaches the wire collection roller 66.

Next the operation of inserting the wire electrode 2 through the starting hole 4 will be described with reference to FIGS. 1 to 5.

Before the insertion operation begins, the workpiece 6 is positioned as shown in FIG. 1, the starting hole 4 aligned with the first and second wire guides 8 and 10. The second pipe guide 22 is supported in the up position by compressed air fed through the second air feeding port 28. The tip of the wire electrode 2 is disposed below the second pipe guide 22, the wire electrode 2 having previously been cut by the cutter 40.

Figure 2:
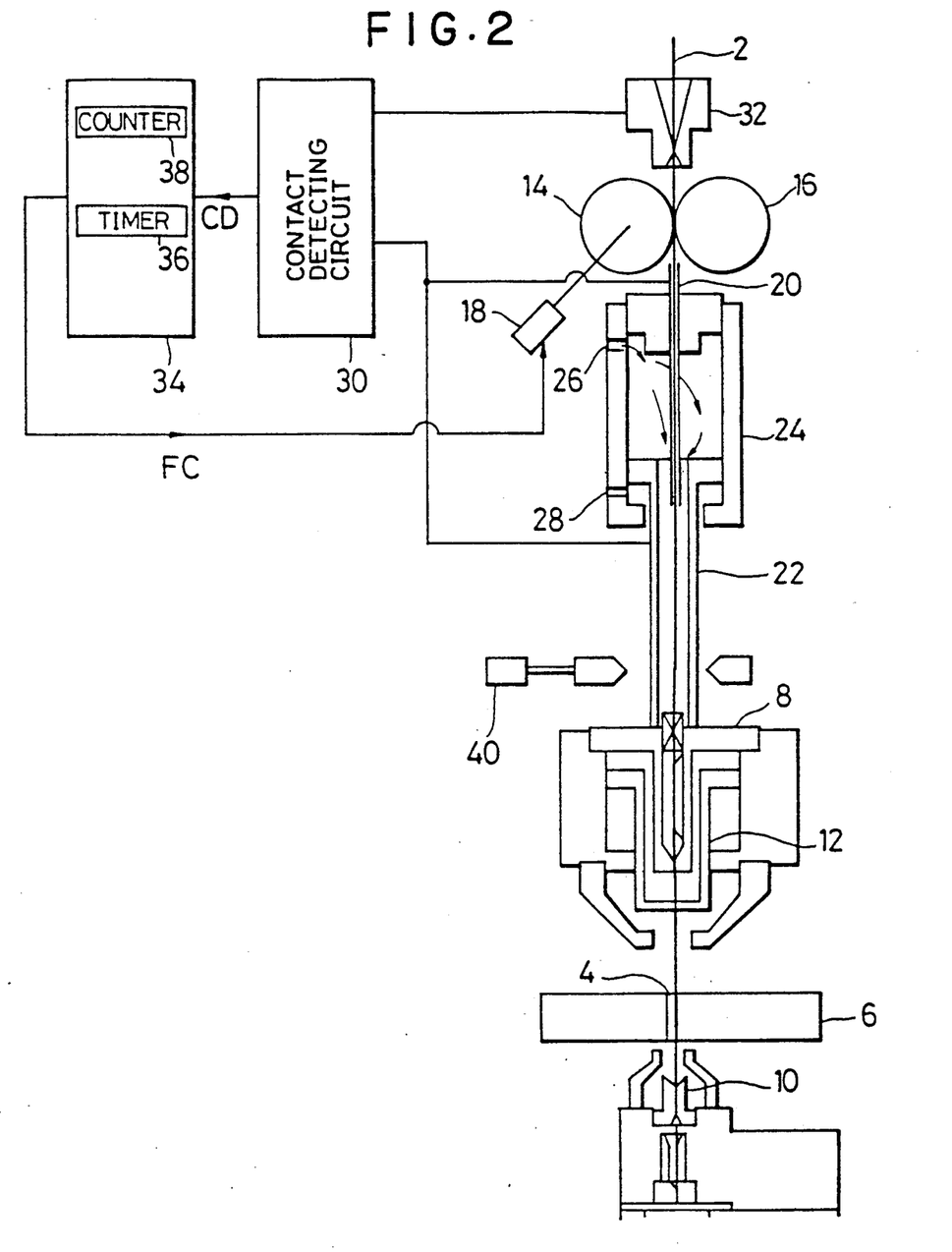
FIG. 2 illustrates the state during insertion.

With reference to FIG. 2, to insert the wire electrode 2, compressed air is fed through the first air feeding port 26 as indicated by arrows, driving the second pipe guide 22 down until it meets the first wire guide 8. The compressed air, which is fed under a pressure of, for example, 4 to 5 kg/cm$^2$, also enters the second pipe guide 22 via the gap between the first pipe guide 20 and second pipe guide 22.

Figure 3:
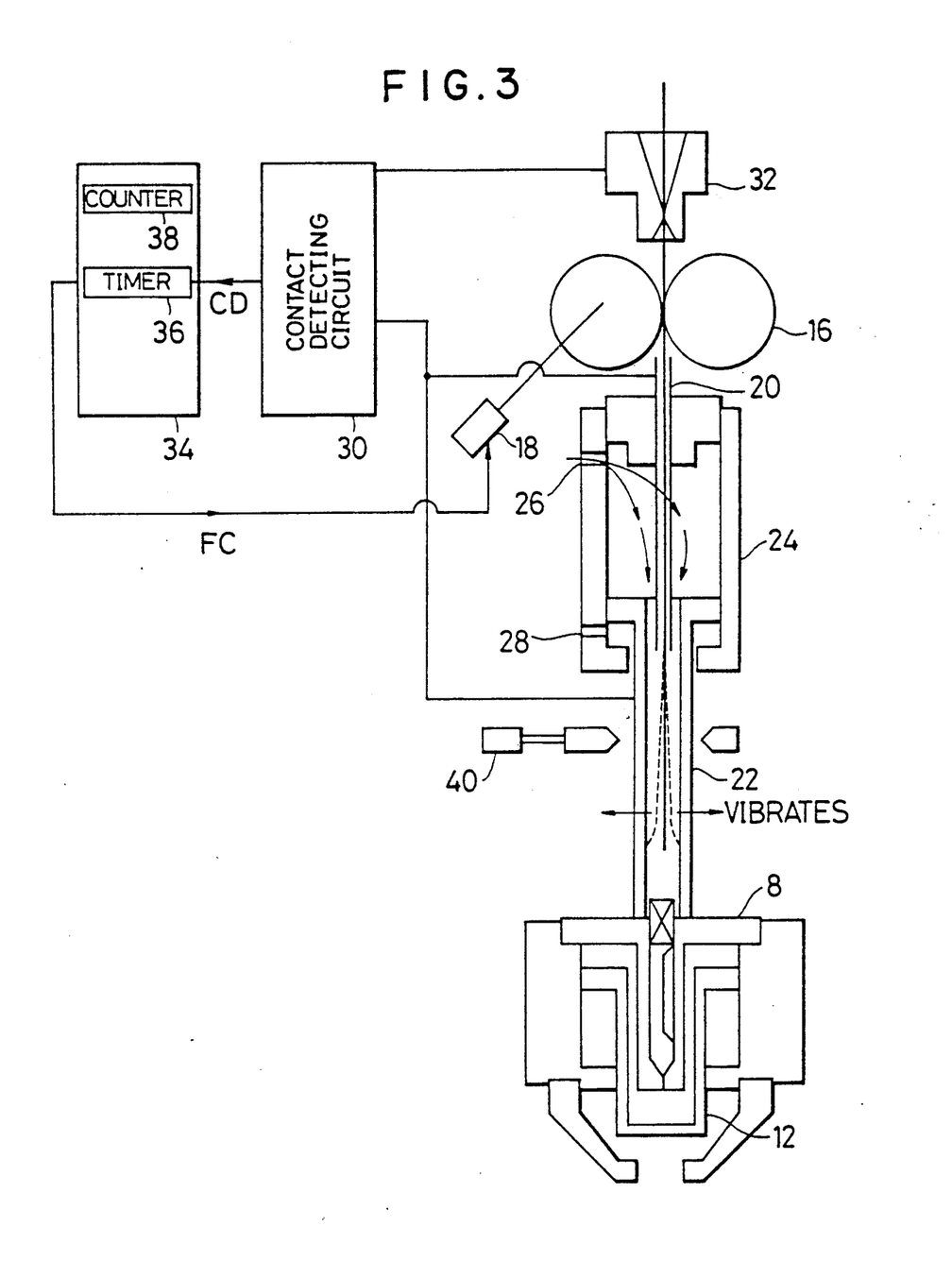
FIG. 3 illustrates vibration of the wire electrode during insertion.

With reference to FIG. 3, on command from the control circuit 34, the motor 18 begins driving the feed roller 14 to feed the wire electrode 2 downward toward the first wire guide 8 and the starting hole 4 in the workpiece 6. As the wire electrode 2 is fed, the flow of compressed air in the second pipe guide 22 causes the wire electrode 2 to vibrate as indicated by the broken lines and the arrows in the drawing, the tip of the wire electrode 2 repeatedly bouncing off the inner wall of the second pipe guide 22. Contact between the tip of the wire electrode 2 and the second pipe guide 22 is detected by the contact detecting circuit 30, but since the duration of the contact is much shorter than the time T, the control circuit 34 does not initiate corrective action.

With reference again to FIG. 2, as the feed roller 14 continues to feed the wire electrode 2, if insertion proceeds normally, the second pipe guide 22 guides the tip of the wire electrode 2 to the first wire guide 8. The tip of the wire electrode 2 passes through the first wire guide 8 and toward the starting hole 4 in the workpiece 6. The nozzle 12 produces a water jet, not shown in the drawing, that guides the tip of the wire electrode 2 through the starting hole 4 to the second wire guide 10. From the second wire guide 10, the wire electrode 2 proceeds through further guiding means, not shown in the drawings, to a wire collection roller, also not shown. Insertion is completed when the tip of the wire electrode 2 engages the wire collection roller.

Progress of the wire electrode 2 may be impeded during insertion. For example, the tip of the wire electrode 2 may be obstructed at the first wire guide 8, although the flow of compressed air through the second pipe guide 22 tends to prevent such obstruction. The tip may furthermore catch on the workpiece 6 or the second wire guide 10, particularly if the starting hole 4 is inaccurately aligned. Friction between the wire electrode 2 and the first or second wire guide 8 or 10 may also impede the progress of the wire electrode 2. If progress is impeded, further feeding causes the wire electrode 2 to bend or loop along its path inside the first pipe guide 20 and second pipe guide 22, forcing the wire electrode 2 into continuous contact with the first pipe guide 20 or the second pipe guide 22.

If the contact detecting circuit 30 detects continuous contact between the wire electrode 2 and the first pipe guide 20 or second pipe guide 22 for a time T, the control circuit 34 sends a feed control signal FC to the motor 18 to initiate corrective action. One preferred plan of corrective action is to stop feeding the wire electrode by halting the motor 18, then stop feeding compressed air through the first air feeding port 26 and feed compressed air into the cylinder 24 through the second air feeding port 28, thereby raising the second pipe guide 22; then cut the wire electrode with the cutter 40, restoring the state shown in FIG. 1. Next, the insertion operation restarts automatically from the beginning.

A second preferred plan of corrective action is to reverse the motor 18 temporarily, thereby retracting the wire electrode 2, then feed the wire electrode 2 forward toward the starting hole 4 again, resuming the insertion operation without raising the second pipe guide 22 or cutting the wire electrode 2. If this second plan is adopted, it is particularly desirable that the number of repetitions be limited by the counter 38 in the control circuit 34, since the tip of the wire electrode 2 is likely to be damaged by repeated unsuccessful insertion attempts.

Figure 4:
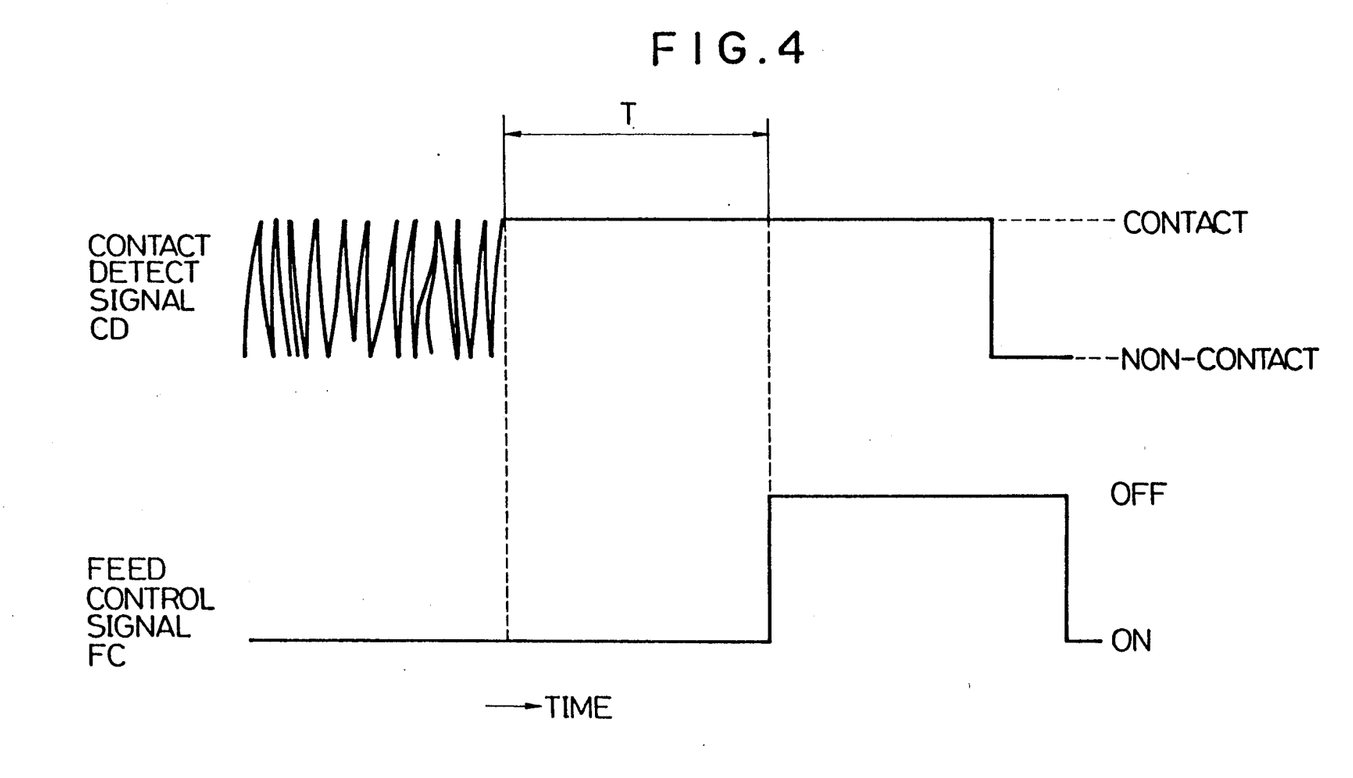
FIG. 4 is a timing diagram illustrating the contact detect signal CD and feed control signal FC.

FIG. 4 illustrates the relationship of the contact detect signal CD produced by the contact detecting circuit 30 to the feed control signal FC produced by the control circuit 34. While insertion proceeds normally, the contact detect signal CD chatters, alternating rapidly between the contact and non-contact states as shown at the left in FIG. 4. The feed control signal FC remains in the state designated ON in FIG. 4, causing the motor 18 to drive the feed roller 14 forward. If the wire electrode 2 becomes impeded, the contact detect signal CD stays in the contact state. If this state continues for a duration of time T, the control circuit 34 turns the feed control signal FC OFF, causing the motor 18 to stop or reverse as described above. When corrective action frees the wire electrode 2 of its impedance, the contact detect signal CD returns to the noncontact or chattering state, after which the feed control signal FC is switched ON again to resume insertion. Normal operation is thereby recovered automatically.

Figure 5A:
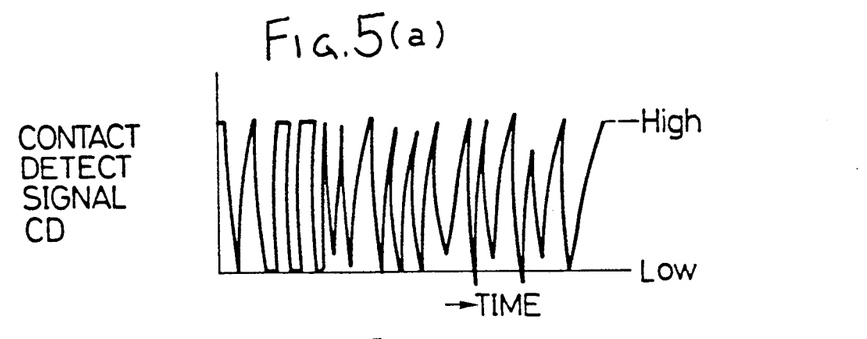
FIGS. 5(a), 5(b), and 5(c) show a timing diagram illustrating successful insertion, unsuccessful insertion, and natural recovery from impedance.
Figure 5B:
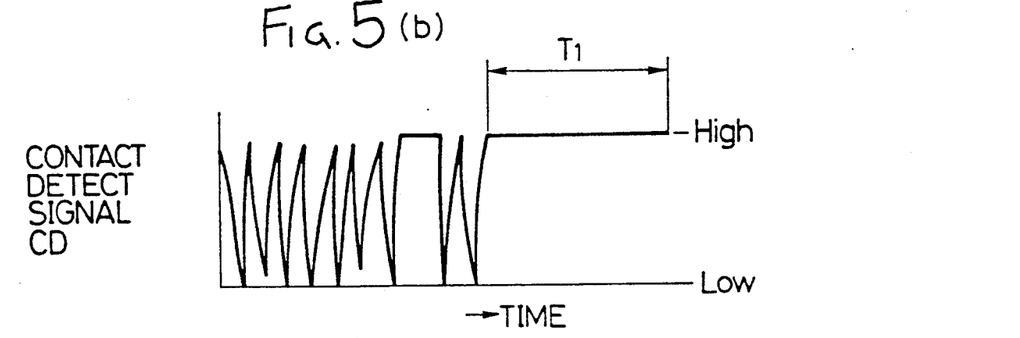

FIG. 5 illustrates the contact detect signal CD for three cases of insertion. In case (a) in FIG. 5, the contact detect signal CD displays a chattering waveform throughout the insertion operation, which is completed normally without impedance. In case (b) in FIG. 5, the wire electrode 2 is impeded for a time $T_1$ exceeding T. If feeding were to continue for the time $T_1$, the wire electrode 2 would be in danger of riding off the feed roller 14, but before automatic insertion can be disabled in this way the control circuit 34 initiates corrective action as illustrated in FIG. 4.

Figure 5C:
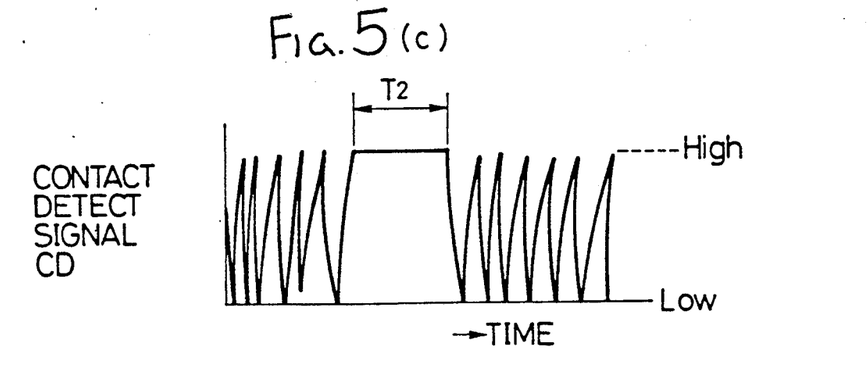

In case (c) in FIG. 5, the wire electrode 2 is impeded for a time $T_2$ less than T, but then springs free due to its own stiffness, assisted by the vibration caused by compressed air. In this case normal insertion is recovered naturally, without the need for corrective action. The time T is preferably longer than the maximum time $T_2$ in which natural recovery is likely, but shorter than the minimum time $T_1$ in which the wire electrode 2 is likely to ride off the feed roller 14.

FIG. 6 is a schematic drawing of the contact detecting circuit 30. The contact detecting circuit 30 comprises an electrical power supply 42 having a first terminal 44 and a second terminal 46 at different potentials. The first terminal 44 is electrically coupled to the contact cone 32, thence to the wire electrode 2. A resistor 48 in the contact detecting circuit 30 has a first lead 50 electrically coupled to the second terminal 46 and a second lead 52 electrically coupled to the first pipe guide 20 and second pipe guide 22. When the wire electrode 2 is not in contact with the first pipe guide 20 or second pipe guide 22, the power supply 42 and resistor 48 form an open circuit and the first lead 50 and second lead 52 are both at the potential of the second terminal 46. When the wire electrode 2 makes contact with the first pipe guide 20 or second pipe guide 22 the circuit is closed, and the first lead 50 is at the potential of the second terminal 46 while the second lead 52 is at substantially the potential of the first terminal 44.

The potential difference between the first lead 50 and the second lead 52 constitutes the contact detect signal CD: the contact detect signal CD is in the contact state when the potential difference exceeds a certain value, and in the non-contact state otherwise. If the potential difference between the first lead 50 and the second lead 52 exceeds this value continuously for the time T, the control circuit 34 initiates corrective action.

The scope of this invention is not restricted to the structures shown in the drawings, but includes many modifications and variations that will be apparent to one skilled in the art. For example, circuits other than the one in FIG. 6 can be used to detect contact between the wire electrode and pipe guides, and means other than compressed air can be used to vibrate the electrode wire.

What is claimed is:

1. An automatic wire feeding method for inserting a wire electrode through a starting hole in a workpiece, comprising steps of:
   feeding said wire electrode through a pipe guide toward said starting hole;
   causing said wire electrode to vibrate within said pipe guide;
   detecting contact between said wire electrode and said pipe guide; and
   initiating corrective action if said contact continues for a certain length of time.

2. The method of claim 1, wherein said wire electrode is caused to vibrate by feeding compressed air into said pipe guide.

3. The method of claim 1, wherein said corrective action comprises steps of:
   stopping the feeding of said wire electrode;
   cutting said wire electrode; and
   resuming the feeding of said wire electrode.

4. The method of claim 1, wherein said corrective action comprises steps of:
   retracting said wire electrode; and
   feeding said wire electrode toward said starting hole again.

5. The method of claim 4, wherein the number of times said corrective action can be taken is limited.

6. An automatic wire feeding apparatus for inserting a wire electrode through a starting hole in a workpiece, comprising:

a first wire guide disposed facing said workpiece, for guiding said wire electrode into said starting hole;

a second wire guide disposed facing said workpiece on the opposite side from said first wire guide, for guiding said wire electrode out of said starting hole;

feeding means for feeding said wire electrode toward said first wire guide;

guiding means for guiding said wire electrode between said feeding means and said first wire guide;

vibrating means for causing said wire electrode to vibrate in said guiding means;

a contact detecting circuit for detecting contact between said wire electrode and said guiding means and producing a contact detect signal CD having one state representing contact and another state representing noncontact; and a control circuit electrically coupled to said feeding means and said contact detecting circuit, for receiving said contact detect signal CD from said contact detecting circuit and, if said contact detect signal CD continues in the state representing contact for a certain length of time, sending a control signal to said feeding means to initiate corrective action.

7. The automatic wire feeding apparatus of claim 6, further comprising a counter disposed in said control circuit for limiting the number of times said corrective action can be repeated.

8. The automatic wire feeding apparatus of claim 6, wherein said vibrating means comprises means for feeding compressed air into said guiding means.

9. The automatic wire feeding apparatus of claim 6, wherein said control signal causes said feeding means to retract said wire electrode temporarily.

10. The automatic wire feeding apparatus of claim 6, further comprising means for raising and lowering said guiding means, and a cutter for cutting said wire electrode as part of said corrective action.

11. An automatic wire feeding apparatus for inserting a wire electrode through a starting hole in a workpiece, comprising:

a first wire guide disposed facing said workpiece, for guiding said wire electrode into said starting hole;

a second wire guide disposed facing said workpiece on the opposite side from said first wire guide, for guiding said wire electrode out of said starting hole;

a feed roller;

a pinch roller for pressing said wire electrode against said feed roller;

a motor for rotatively driving said feed roller, thereby feeding said wire electrode toward said first wire guide;

a cylinder disposed between said feed roller and said first wire guide;

a first pipe guide penetrating one end of said cylinder, for guiding said electrode wire from said feed roller into said cylinder;

a second pipe guide, one end whereof forms a movable piston in said cylinder, surrounding said first pipe guide with a gap therebetween, for guiding said wire electrode from said first pipe guide to said first wire guide;

a first air feeding port, for feeding compressed air into said cylinder to move said second pipe guide toward said first wire guide, said compressed air also entering said second pipe guide through said gap;

an electrical power supply having a first terminal and a second terminal;

a contact for electrically coupling said first terminal to said wire electrode;

a resistor having a first lead electrically coupled to said second terminal, and a second lead electrically coupled to said first pipe guide and said second pipe guide;

a control circuit electrically coupled to said motor, said first lead, and said second lead, for sending a control signal to said motor if the potential difference between said first lead and said second lead exceeds a certain value for a certain length of time continuously.

12. The automatic wire feeding apparatus of claim 11, wherein said control circuit comprises a timer.

13. The automatic wire feeding apparatus of claim 11, wherein said control circuit comprises a counter for limiting the number of times said control signal can be sent to said motor.

14. The automatic wire feeding apparatus of claim 13, wherein said control signal causes said motor to reverse temporarily, thereby retracting said wire electrode.

15. The automatic wire feeding apparatus of claim 11, further comprising:

a second air feeding port, controlled by said control circuit, for feeding compressed air into said cylinder to retract said second pipe guide from said first wire guide; and a cutter, controlled by said control circuit, for cutting said wire electrode at a point between said second pipe guide and said first wire guide.

16. The automatic wire feeding apparatus of claim 15, wherein said control signal causes said motor to stop temporarily; and then said control circuit causes said second air feeding port to feed compressed air into said cylinder and then causes said cutter to cut said wire electrode.

* * * * *